Oct. 18, 1955     F. M. KIRKPATRICK     2,721,248
TUBE WELDER
Filed May 25, 1953     4 Sheets-Sheet 2
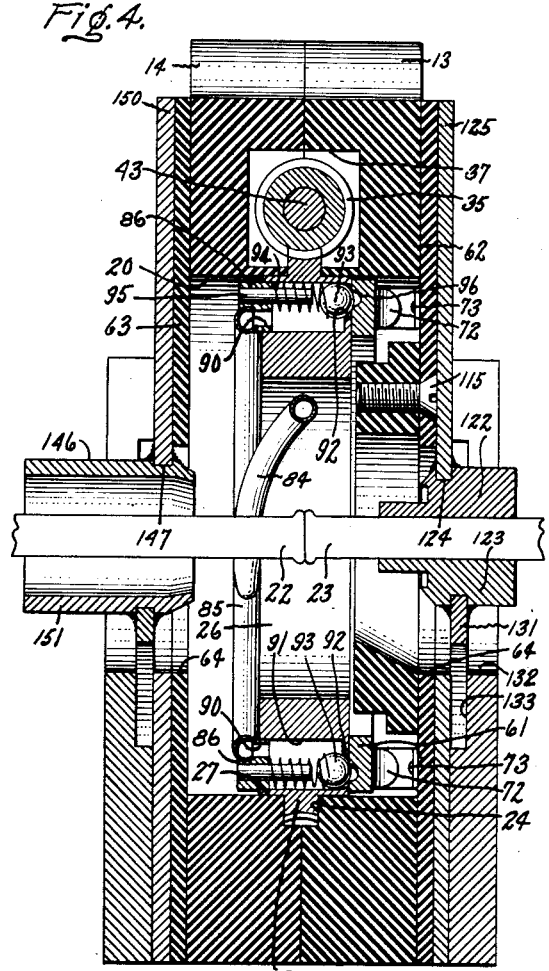
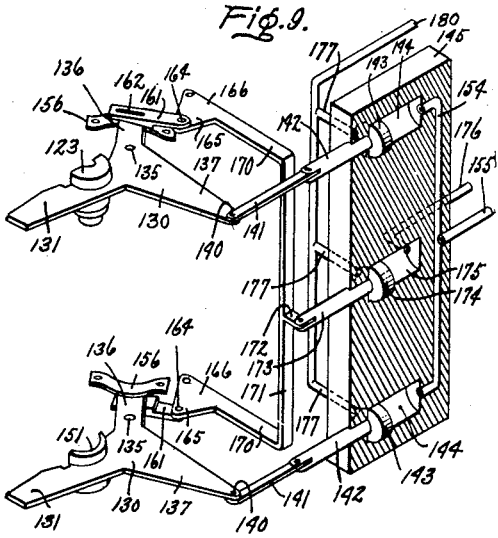
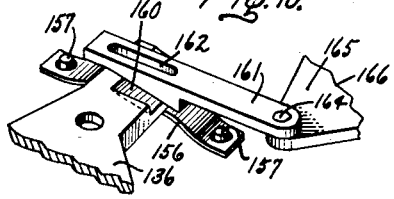
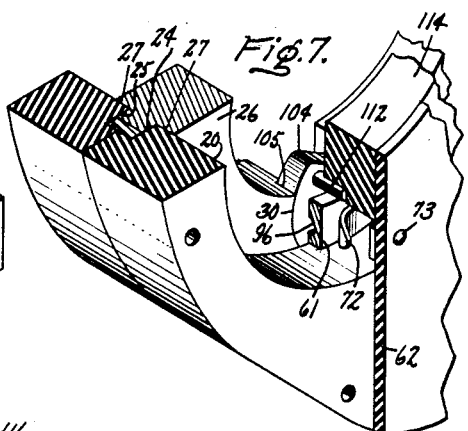
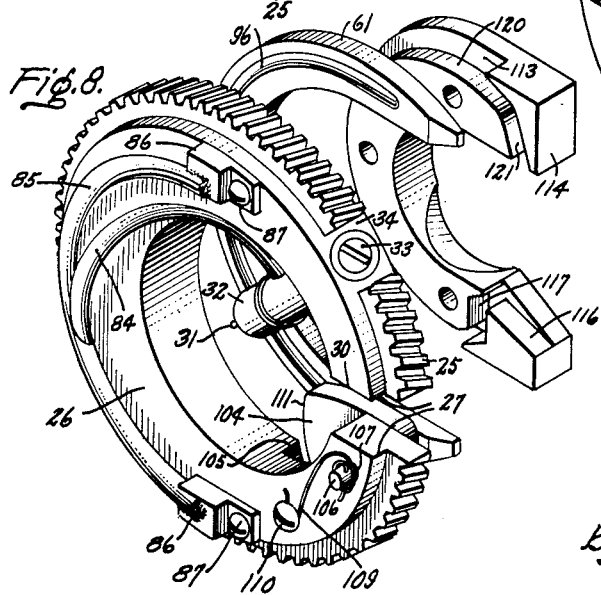
Inventor:
Floyd M. Kirkpatrick,
by *His Attorney.*

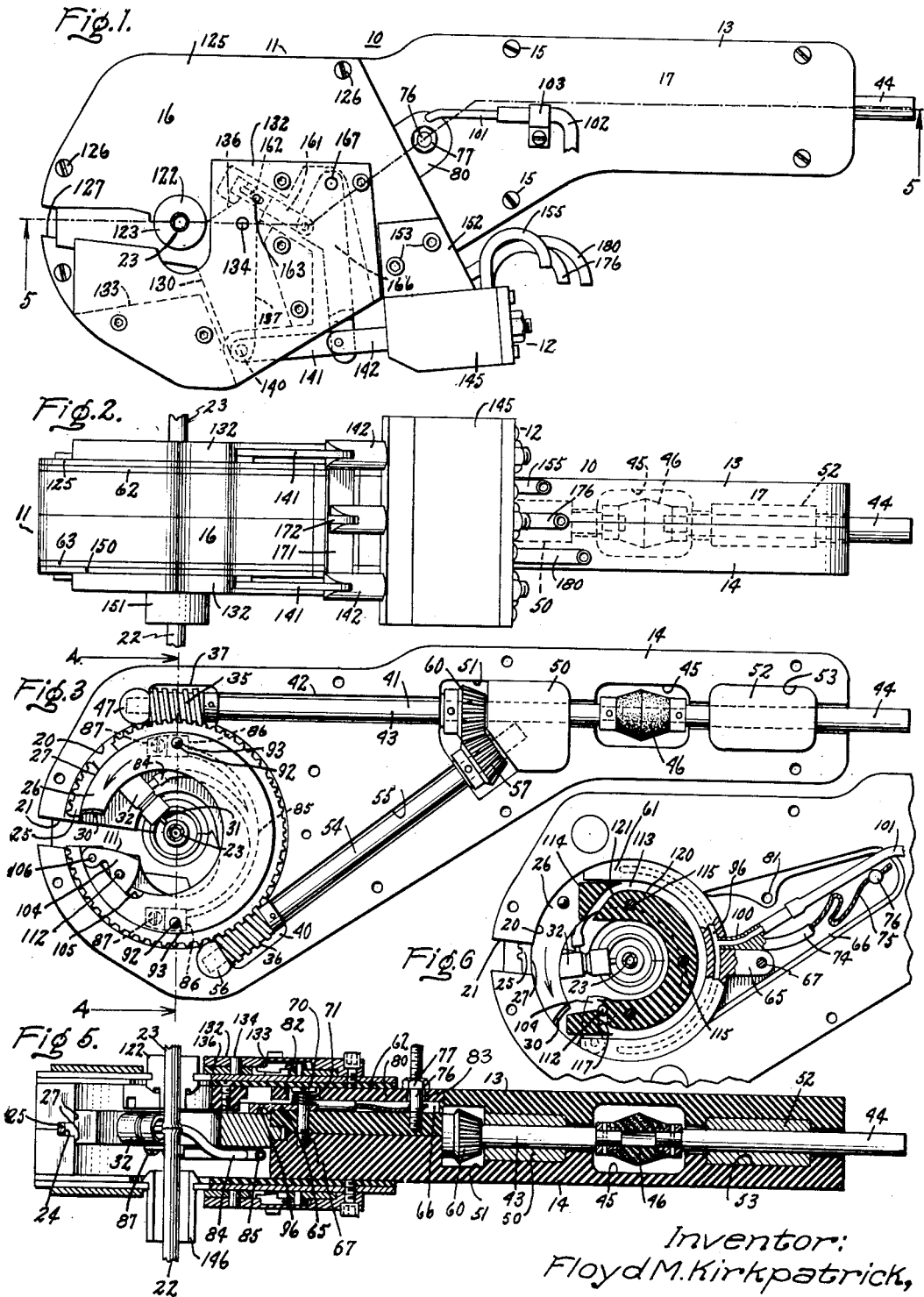

Oct. 18, 1955  F. M. KIRKPATRICK  2,721,248
TUBE WELDER
Filed May 25, 1953  4 Sheets-Sheet 3
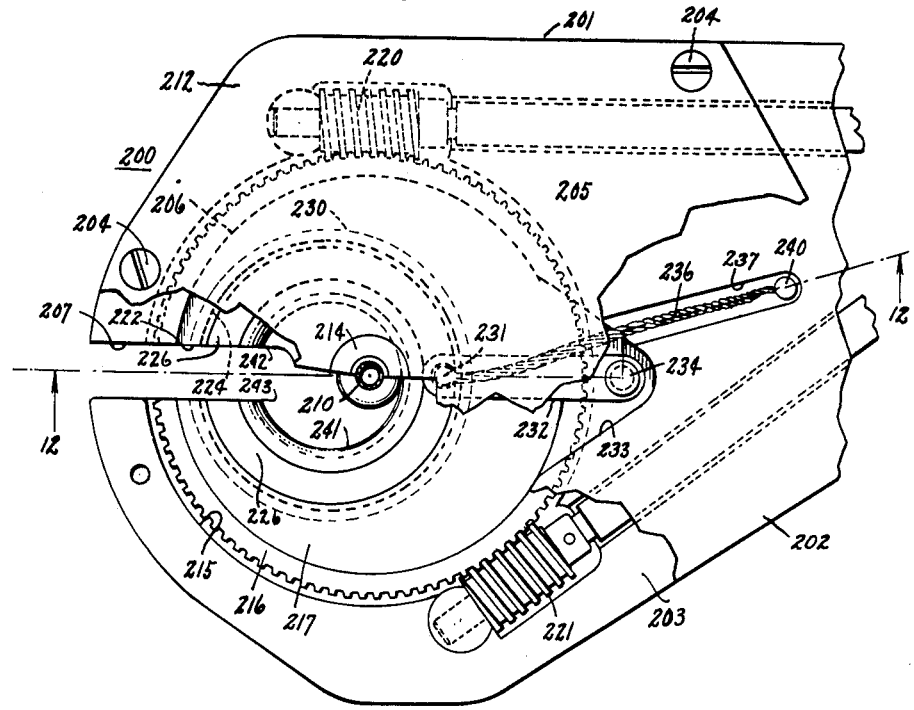
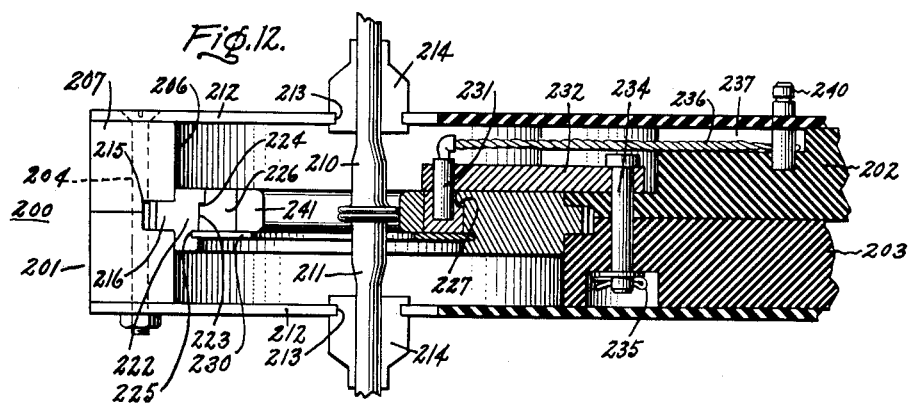
Inventor:
Floyd M. Kirkpatrick,
by
His Attorney.

Oct. 18, 1955  F. M. KIRKPATRICK  2,721,248
TUBE WELDER
Filed May 25, 1953  4 Sheets-Sheet 4
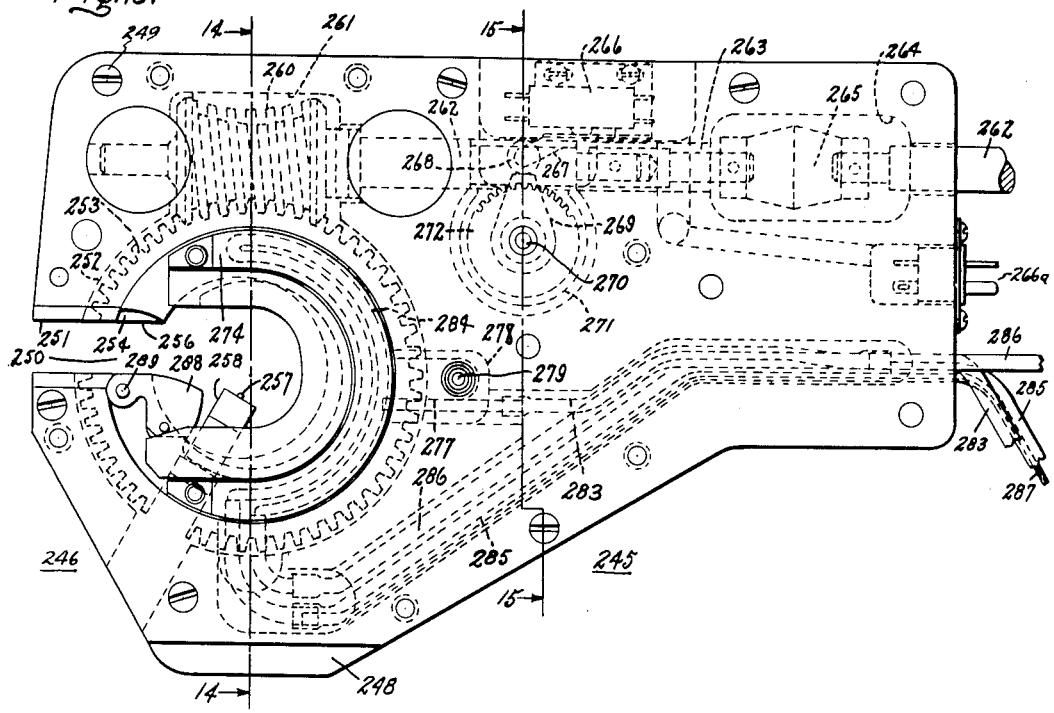
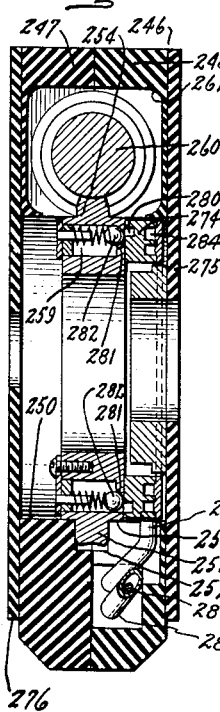
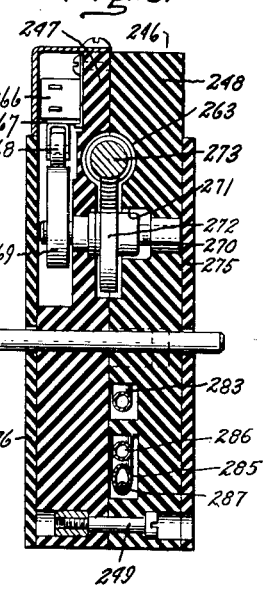
Inventor:
Floyd M. Kirkpatrick,
by *His Attorney.*

United States Patent Office 2,721,248
Patented Oct. 18, 1955

2,721,248

TUBE WELDER

Floyd M. Kirkpatrick, Erie, Pa., assignor to General Electric Company, a corporation of New York Application May 25, 1953, Serial No. 357,097

27 Claims. (Cl. 219—8)

My invention relates to welding apparatus and pertains more particularly to welding apparatus for butt welding tubing.

In some manufactured products such as refrigerators it is desirable to include closed tubing circuits. Closing the circuits as by butt welding or joining the ends of tubing presents a problem inasmuch as most available butt welding apparatus is of the type that has to be passed over the ends of the tubing in order to be positioned for welding. This type, of course, is unadaptable for closing tubing circuits. Accordingly, the primary object of my invention is to provide new and improved welding apparatus adapted for butt welding or joining the ends of tubing in a closed circuit.

Another object of my invention is to provide, in a new and improved welding device for butt welding the ends of tubing in a closed circuit, means whereby excessive oxidation at the weldment is prevented throughout the welding operation.

Still another object of my invention is to provide a new and improved device for butt welding the ends of tubing in a closed circuit which is simple in construction and easily operated.

Further objects and advantages of my invention will become apparent as the following description proceeds and the features of novelty which characterize my invention will be pointed out with particularity in the claims annexed to and forming part of this specification.

In carrying out the objects of my invention I provide a rotatable annular member and means for driving the annular member. The annular member includes an opening and a slot connecting the opening with the exterior of the annular member. The slot permits admittance into the opening of tubing to be welded. An electrode is disposed in the opening of the annular member and when the annular member is rotated, the electrode is caused to rotate about the tubing thereby to effect a circumferential weld on the tubing. To minimize oxidation at the weldment, I provide means whereby an inert gas is directed at the weldment throughout the welding operation. Additionally, in one form of my invention I provide means for cooling the assembly.

For a better understanding of my invention reference may be had to the accompanying drawing in which Fig. 1 is a side elevational view of a first embodiment of my invention;

Fig. 2 is a view of the under side of the first embodiment;

Fig. 3 is a view in which the first frame is removed in order to illustrate structural details of the ring gear;

Fig. 4 is an enlargement of a section taken along the line 4—4 in Fig. 3 and looking in the direction of the arrows;

Fig. 5 is a section taken along the line 5—5 in Fig. 1 and looking in the direction of the arrows;

Fig. 6 is a fragmentary and partially sectionalized view of the device in which a side plate is removed to illustrate details of the gas ring and face cam;

Fig. 7 is an enlarged fragmentary perspective view illustrating details of the gas gate;

Fig. 8 is an enlarged exploded perspective view illustrating the relationships between the ring gear, the gas ring, and the face cam;

Fig. 9 is a perspective and somewhat schematic view illustrating the tube clamping assembly;

Fig. 10 is an enlarged fragmentary perspective view illustrating structural details of the clamping assembly;

Fig. 11 is a fragmentary side elevational view of a second embodiment of my invention, partly broken away to illustrate certain features thereof;

Fig. 12 is a section taken along the line 12—12 in Fig. 11 and looking in the direction of the arrows;

Fig. 13 is a side elevational view of a third embodiment of my invention having a side plate thereof removed to reveal certain constructional details;

Fig. 14 is a section taken along the line 14—14 in Fig. 13 and looking in the direction of the arrows; and Fig. 15 is a section taken along the line 15—15 in Fig. 13 and looking in the direction of the arrows.

Referring to Figs. 1 and 2, I have shown a first embodiment of my invention generally designated 10 and including a holder or holder assembly 11 and a tube clamping assembly 12.

The holder 11 comprises first and second frames 13 and 14, respectively, formed of an insulative material and fastened together by a plurality of screws 15. Forming the holder 11 in two pieces in this manner facilitates the provision of openings, bearing houses and the general assembly of the device. However, to simplify description of the invention the holder 11 will be hereinafter treated as though it were one complete frame member except when it is thought that the description will be clarified by a specific reference to either the first frame 13 or the second frame 14.

As viewed in Figs. 1 and 2 the left side of the holder 11 is formed as an enlarged portion or head 16 and the right side is formed as a reduced portion or handle 17. As seen in Figs. 3, 4 and 6, the head 16 is provided with an enlarged, transverse circular opening 20. A slot 21 formed in the left side of the head 16 connects the opening 20 with the exterior of the holder and permits the holder to be passed over the sides of the ends of tubes 22 and 23 to be joined or butt welded.

As seen in Figs. 4, 5 and 7 an annular groove 24 is formed centrally in the inner periphery of the circular opening 20. Bearing in the annular groove 24 is the back or toothed rim 25 of an annular member or ring gear 26 formed of an electrically conductive material such as steel or bronze. Formed on either side of the toothed rim 25 of the ring gear 26 is a shoulder 27 which bears on the periphery of the circular opening 20 adjacent the annular groove 24 formed therein.

Provided in the ring gear 26 and corresponding to the slot 21 in the holder 11 is a split or slot 30. When the slot 21 in the holder 11 and the slot 30 in the ring gear 26 are aligned or in register the ends of the tubing to be welded are permitted entrance into the ring gear. After the tube ends have been admitted into the ring gear 26, they are held concentric with respect to the ring gear by the above-mentioned clamping assembly 12 which will be described in detail hereinafter.

Provided for effecting the arc to weld the ends of the tubes 22 and 23 together and thereby arrive at a welded joint or butt weld is an electrode 31 formed of a high resistance material such as tungsten or sintered thoria-tungsten and best seen in Figs. 3-6 and 8. The electrode 31 is disposed stationarily and concentrically in a spout 32 from the end of which just the tip of the electrode 31 extends. The spout 32 is secured radially to the inner periphery of the ring gear 26 by a screw 33 which passes through the ring gear at a blank portion 34 provided in the toothed rim 25 thereof. The screw 33 provides a good electrical connection between the electrode 31 and the ring gear 26.

In the arrangement described to this point the ring gear 26 is adapted for being rotated and when rotated causes the tip of the electrode 31 to circumscribe a circle approximating the circumference of a weldment to be effected between the ends of the tubes 22 and 23.

Provided for meshing with the toothed rim 25 of the ring gear 26 to rotate the ring gear for rolling the electrode about the tubing are a first worm 35 and a second worm 36. The first worm 35 is disposed in a housing 37 formed in the holder 11 and communicating with the circular opening 20. The second worm 36 is disposed in a second housing 40 similarly formed in the holder 11 and communicating with the opening 20. The first worm 35 is fixed on a drive shaft 41 just inward of the left hand end thereof. The drive shaft 41 passes through a longitudinal passage 42 extending through the holder 11 from the head 16 through the handle 17 and to the exterior of the holder. The drive shaft 41 comprises a first length 43 and a second length 44 connected in a housing 45 in the holder by a flexible coupling 46. The flexible coupling 46 is intended to yield and fail and thereby avoid damage to the device in the event that for some reason the first length 43 of the drive shaft is prevented from rotating when the second length 44 is positively rotated. The left hand end of the first length 43 of the drive shaft is journaled between an end bearing 47 and a bearing block 50 disposed in a bearing housing 51 formed in the holder 11 substantially intermediate the head 16 and the handle 17. The second length 44 of the drive shaft bears in a block 52 disposed in another bearing housing 53 provided in the handle of the holder. The end of the second length 44 extends outwardly from the handle 17 for having suitable driving means (not shown) connected thereto.

The second worm 36 is fixed on a spindle 54 which passes through a passage 55 extending obliquely from the worm housing 40 to the bearing housing 51. The spindle 54 is journaled between another end bearing 56 and the above-mentioned bearing block 50. In the housing 51 a bevel gear 57 fixed on the spindle 54 meshes with another bevel gear 60 fixed on the first length 43 of the drive shaft. With the arrangement just described the ring gear 26 is driven from two almost diametrically opposed positions. Also, by providing any suitable means for controlling starting and stopping of the driving means employed for rotating the drive shaft, a person operating the device can align the slot 30 in the ring gear 26 with the slot 21 in the holder 11 for permitting entrance of the tubing to be welded into the ring gear.

Following clamping of the tubing and striking of an arc between the electrode 31 and the tubing, the mentioned starting and stopping controls may be manipulated for rotating the ring gear 26 and thereby causing the electrode 31 to roll about the tubing at least a full three hundred and sixty degrees to effect a circumferential weld. Thereafter the controls may be manipulated while no arc is struck in order to realign the slots in the ring gear and the holder and to permit the device to be removed from the welded tubing.

In order to effect operation of the device in the above-described manner it is necessary to supply current to the electrode 31. Also, in order to prevent excessive oxidation of the tubing at the weldment it is essential to supply an inert gas such as argon or helium to the tubing at the arc. In Figs. 4 and 6 to 8 is shown a gas ring 61 formed of copper or any similarly electrically conductive material. By use of the gas ring 61 I accomplish the supply of both the current to the electrode 31 and an inert gas to the spout 32 surrounding the electrode. The gas ring 61 is horseshoelike in construction and lies in a plane adjacent the ring gear 26 between the ring gear and an insulative plate 62 suitably secured to the outer side of the first frame 13. A similar insulative plate 63 is secured to the outer side of the second frame 14. The plates 62 and 63 cover substantially all of both ends of the circular opening 20 except for openings 64 which are aligned with each other and concentric with the ring gear 26. The plates 62 and 63 also include slots corresponding to the slots 21 and 30 in the holder and ring gear, respectively. Formed outwardly of the center of the gas ring 61 is an arm 65 which extends into an elongated recess 66 formed in the outer side of the first frame 13. As best seen in Fig. 6 the gas ring 61 is secured to the holder in the recess 66 by a screw 67 which passes through the extremity of the arm 65 and is threaded into the holder. The screw 67 includes an enlarged head 70 and carries a coil spring 71 which engages both the under side of the screw head 70 and the outer side of the arm 65. By this arrangement the gas ring 61 is secured in the holder 11 and the center portion thereof is biased for engagement with the ring gear 26. As best seen in Figs. 4 and 7 the ends of the gas ring 61 are each biased into engagement with the ring gear 26 by a leaf spring 72 bent upon itself and secured as at 73 to the inner side of the insulative plate 62. Suitably secured to the gas ring 61 at an extension 74 formed off the arm 65 and for supplying current to the gas ring is one end of a cable 75. The other end of the cable 75 is secured to a terminal post 76 threaded into the holder 11 in the recess 66 provided with a nut 77 for fastening a line from a suitable power source to the post. Provided for closing the recess 66 is an insulative cover 80 held in place by a screw (not shown) which engages a threaded hole 81 in the housing. The cover 80 includes an aperture 82 for receiving the head 70 of the screw 67 and a similar aperture 83 permitting passage through the cover of the post 76. In this arrangement current passes from the post 76 through the cable 75 to the gas ring 61. The gas ring 61 is biased into engagement with the ring gear 26 by the coil spring 71 and the leaf springs 72 and in this manner the current is conducted to the ring gear for supplying the electrode 31. Graphite may be utilized on the engaging surfaces between the gas ring 61 and the ring gear 26 for serving two purposes, namely, to minimize galling and to reduce resistance to the flow of current from the gas ring to the ring gear.

In order to minimize oxidation at the weldment an inert gas is directed at the weldment during the welding operation. As seen in Figs. 3, 4, 5 and 8 this is accomplished by supplying the gas through a tube 84 to the spout 32 about the electrode 31. The tube 84 connects the spout 32 with substantially the midpoint of an arcuate tube 85. The tube 85 is disposed on the side of the ring gear 26 opposite the gas ring 61 and is secured at each end to a cap 86. The caps 86 are secured in diametrically opposed relation to the side of the ring gear 26 by screws 87. As best seen in Fig. 4 the caps 86 are each formed with a transverse bore 90 which communicates with the arcuate tube 85 and is in register with an enlarged bore 91 extending into the ring gear 26 from the side to which the cap is secured. Connecting the enlarged bores 91 with the opposite sides of the ring gear 26 are smaller bores 92. Provided in the enlarged bores 91 for cooperating with the small bores 92 are balls 93. The balls 93 are biased by coil springs 94 for being seated in and closing the smaller bores 92. Studs 95 formed on the caps 86 and extending into the enlarged bores 91 are provided for being received in the coil springs 94 and thereby holding the springs in place.

Formed in the inner side of the gas ring 61 is an arcuate gas groove 96. When the ring gear 26 is positioned in the manner shown in Fig. 3 with the slot 30 therein in register with the slot 21 in the holder 11, gas ring 61 unseats both balls 93 and the smaller bores 92 in the ring gear both communicate with the arcuate groove 96 in the gas ring. When the ring gear 26 is in any other rotative position, at least one of the balls 93 is unseated and the corresponding smaller bore 92 communicates with the arcuate groove 96. Formed on the gas ring 61 adjacent the arm 65 and communicating with the arcuate groove 96 is a tubular portion 100 which, like the arm 65, extends into the recess 66 in the holder. A tube 101 connected to the tubular portion in the recess 66 passes through a suitable aperture in the plate 80 which covers the recess and connects with another tube 102 secured, as by a clamp 103, to the exterior of the first frame 13. The tube 102 may be a connection to any suitable source of inert gas such as argon or helium. In this arrangement the inert gas is fed through the tubes 102, 101 and the tubular portion 100 to the arcuate groove 96 and the gas ring 61. As pointed out above, regardless of the rotative position of the ring gear 26 at least one of the smaller bores 92 will communicate with the arcuate groove 96 of the gas ring 61. As a result the gas flows through one of the bores 91, the corresponding side of the arcuate tube 85 and the tube 84 to the gas spout 32 for being directed at the weldment. In this manner excessive oxidation at the weldment is prevented throughout the welding operation or, in other words, during the time the electrode 31 is being rolled about the joint being welded.

As best seen in Figs. 3 and 6 to 8 the ring gear 26 carries a gas gate 104 for closing and opening the slot 30 therein in accordance with the rotative position of the ring gear. The gas gate 104 closes the slot 30 when the slot lies adjacent the arcuate groove 96 in the gas ring thereby to minimize gas leakage from the arcuate groove, and opens the slot 30 when it lies in register with the slot 21 in the holder 11 thereby to permit the device to be positioned over the side of tubing to be welded or removed over the side of welded tubing. To accomplish this operation the gate 104 is located in a step 105 formed in the gas ring side of the ring gear 26 and is provided with a laterally protruding stud 106 which extends rotatably through an aperture 107 in the ring gear. The extremity of the stud 106 extends beyond the opposite side of the ring gear and has suitably secured thereto one end of a torsion spring 109. The other end of the torsion spring 109 is anchored as by a screw 110 to the side of the ring gear; and by this arrangement the gate 104 is normally biased clockwise in Fig. 3. When the ring gear is positioned with the slot 30 therein in register with the slot 21 in the holder 11 the spring 109 causes the gate 104 to assume its most clockwise position in which it engages the side of the step 105 and does not obstruct the slot 30 thereby permitting the device to be positioned over the side of the tubing to be welded or removed after the welding operation has been completed.

During the welding operation the ring gear 26 is rotated counterclockwise and it becomes necessary for the gate 104 to close the slot 30 therein, thereby to minimize gas leakage from the arcuate groove 96. The gate 104 is formed with an arcuate surface 111 corresponding to the circumference of the shoulders 27 on the ring gear 26 and the inner periphery of the circular opening in the holder 11. Provided on the gas ring side of the gate 104 is another stud 112. As best seen in Figs. 6-8 the stud 112 is adapted to cooperate with a face cam 113 formed in an insulative member 114 secured as by screws 115 to the inner side of the insulative plate 62.

After the tubing to be welded has been clamped in place and the driving means, through the worms 35 and 36, commences to rotate the ring gear 26 counterclockwise in Figs. 3 and 6, the stud 112 on the gate 104 engages and rides upon an inclined surface 116 on the face cam 113 thereby initiating counterclockwise rotation of the gate 104 against the bias of the torsion spring 109. Thereafter the stud 112 rides down a substantially vertical portion 117 of the face cam and the gate 104 is thereby rotated into a position wherein the arcuate surface 111 thereon engages the periphery of the circular opening 20 in the holder and closes the slot 30 in the ring gear. Subsequently, and for approximately 180° the stud 112 rides on an arcuate surface 120 of the face cam 113 during which time the gate 104 effectively closes the slot 30 in the ring gear as the slot moves past the arcuate groove 96 in the gas ring 61. In this manner leakage of gas from the arcuate groove 96 during rotation of the ring gear is minimized. From the arcuate surface 120 of the face cam the stud 112 rides down a sharply inclined surface 121 and then off the cam 113 completely. After the stud leaves the cam 113 the torsion spring 109 again moves the gate 104 to the clockwise position thereof shown in Fig. 3 thereby to open the slot 30 in the ring gear when the slot is in register with the slot 21 in the holder.

As seen in Figs. 1, 2 and 4 the above-mentioned tube clamping assembly 12 includes a stationary or tube positioning jaw 122 and a movable jaw 123. The stationary jaw 122 is secured to the edge of an opening 124 formed in a plate 125 secured to the head of the holder 11 on the outer side of the insulator plate and by screws 126. The plate 125 is further formed with a slot 127 corresponding to the slot 21 in the holder. The inner surface of the stationary jaw 122 corresponds substantially to one-half of the outer circumference of the tubing to be welded. The movable jaw 123 includes an inner surface identical to that of the stationary jaw and when the movable jaw is closed the end of the tubing held between the jaws is positioned concentric with respect to the path of travel of the tip of the electrode 31. Provided for moving the movable jaw 123 between the opened and closed positions thereof is a three-armed bell crank 130. The movable jaw 123 is secured to a first arm 131 of the bell crank which is positioned between the plate 125 and another plate 132 secured to the outer side of the plate 125. The plate 132 is formed with a recess 133 on the inner side thereof for permitting pivotal movement of the bell crank 130. The bell crank is pivoted on a stud 134 protruding inwardly from the plate 132 and received in a hole 135 in a second arm 136 of the bell crank. Pivotally connected to the extremity of a third arm 137 of the bell crank 130 as at 140 is one end of a connecting link 141. The other end of the connecting link 141 is pivotally connected to the end of an extension rod 142 secured to a piston 143. The piston 143 operates in a cylinder 144 formed in a cylinder block 145. The just-described arrangement is duplicated on the opposite side of the holder 11 and the same numerals are employed to indicate corresponding members. However, on the opposite side no tube clamping jaws are provided. Instead a stationary shield 146 is secured in an opening 147 in a plate 150 and a movable shield 151 is secured on the first arm 131 of the bell crank 130. The shields 146 and 151 cooperate to protect the operator of the device from the arc therein. The cylinder block 145 is formed to include a pair of legs 152 which straddle the holder 11. Cap screws 153 passing through the legs 152 thread into the holder 11 and the cylinder block 145 is thereby mounted on the holder.

Formed in the cylinder block 145 and connecting the cylinders 144 is a passage 154. Connected to the passage 154 is a supply tube 155. When fluid such as air is supplied under pressure to the cylinders 144 through the tube 155 in the passage 154 the pistons 143 are moved forward to the positions thereof shown in Fig. 9. Through the extension rods 142 and the links 141 the bell cranks 130 are rotated clockwise in Figs. 1 and 9 thereby moving the movable jaw 123 and the movable shield 151 into the closed positions thereof shown in Figs. 1 and 4.

In order to effect a completely satisfactory butt weld, it is essential that the tubing be so held as to be substantially perfectly perpendicular to the electrode 31. To accomplish this I have provided an arrangement whereby the bell crank 130 is held flush against the side plate 125 when the movable jaw 123 is closed thereby to insure engagement of the stationary and movable jaws 122 and 123 throughout their engaging surfaces. When the jaws are so engaged the tube 23 held thereby is satisfactorily positioned perpendicular to the electrode 31. As seen in Figs. 1, 9 and 10 the arrangement for holding the bell crank 130 flush against the plate 125 when the jaws are closed includes the second arm 136 on the bell crank 130. The arm 136 cooperates with a leaf spring 156 fitted at its ends on a pair of studs 157 protruding from the side plate 125. On the side of the arm 136 opposite the spring 156 the arm is formed to include a cam surface 160. Cooperating with the cam surface 160 is a wedge 161 formed with an elongated slot 162 receiving and being slidably guided by a stud 163 protruding inwardly from the plate 132. Pivotally connected to one end of the wedge 161 as at 164 is an arm 165 of another bell crank 166. The bell crank 166 is pivoted on a stud 167 which also protrudes inwardly from the side plate 132. An arm 170 of the bell crank 166 is formed integrally with one side of a yoke 171. On the other side of the holder 11 the just-described arrangement is also duplicated and the same numerals have been utilized to indicate corresponding parts. From the center of the yoke 171 extends an arm 172. The yoke arm 172 is pivotally connected to an extension rod 173 connected to a piston 174 adapted to operate in a cylinder 175 formed centrally in the cylinder block 145. A tube 176 is provided for connecting the rear end of the cylinder with a source of air under pressure. When air is supplied to the cylinder 175 through the tube 176 the piston 174 is moved forward to the position shown in Fig. 9. Through the extension rod 173 and the yoke 171, both bell cranks 166 are rotated clockwise in Fig. 1 about the pivots 167. In this manner the wedges 161 are moved slidingly into engagement with the cam surfaces 160 on the arms 136 and move the bell cranks 130 inwardly against the plates 125 and 150 against the bias of the leaf springs 156. Thus the movable jaw 123 is held in satisfactory engagement with the stationary jaw 122 and the movable shield 151 is held in similar engagement with the stationary shield 146.

Connected to the front sides of the cylinders 144 and 175 are tubes 177 which in turn are all connected to a common air supply tube 180. When a welding operation is completed, air is supplied to the cylinders through the tubes 180 and 177 whereby the pistons 174 and 143 are all moved to the rear of the cylinders 175 and 144, respectively. As a result the wedges 161 are moved slidingly away from the inclined surfaces 160 on the second arms 136 of the bell cranks and the bell cranks 130 are rotated so as to move the movable jaw 123 and the movable shield 151 out of engagement with the stationary jaw and shield 122 and 146, respectively, for permitting removal of the welded tubing from the device.

In Figs. 11 and 12 I have shown a second embodiment of my invention generally designated 200 and including a holder or holder assembly 201. While the holder 201 comprises first and second side frames 202 and 203, respectively, fastened together by a plurality of screws 204, it will be hereinafter treated as though it were one member. The holder 201 includes an enlarged portion or head 205 formed with a circular opening 206 and a slot 207 connecting the opening 206 with the exterior of the holder. The slot 207 permits the holder 201 to be passed over the sides of the ends of tubes 210 and 211 which are to be butt welded. Suitably secured to the sides of the holder 201 are insulative side plates 212 formed with openings 213 concentric with the circular opening 206 and slots corresponding to the slot 207 in the holder. Secured to each of the side plates 212 at the opening 213 therein are stationary jaws 214.

Formed centrally in the inner periphery of the opening 206 is an annular groove 215. Bearing in the annular groove 215 is the back or toothed rim 216 of an annular member or ring gear 217. Provided for meshing with the toothed rim 216 of the ring gear 217 to drive the ring gear are a first worm 220 and a second worm 221. This arrangement may be identical to that employed in the first embodiment and will not be again described. It differs only in that by means not shown and under control of an operator the ring gear 217 may be driven selectively clockwise or counterclockwise. The purpose for this will be brought out hereinafter.

Provided in the ring gear 217 and corresponding to the slot 207 in the holder 201 is a split or slot 222. When the slot 207 in the holder 201 and the slot 222 in the ring gear 217 are in register the ends of the tubes 210 and 211 to be butt welded are permitted entrance into the ring gear. After the tube ends are positioned in the stationary jaws 214, they are securely held concentric with respect to the ring gear by clamping means which are not shown but which may be similar to that described above with respect to the first embodiment 10.

Provided in the ring gear 217 is an eccentric opening 223 counterbored to provide a shoulder 224 and further machined to include an annular groove 225. Positioned rotatably in the opening 223 is a split ring 226 formed to include a shoulder 227 for cooperating with the shoulder 224 in the ring gear 217. A retaining ring 230 is provided for being seated in the annular groove 225 and is effective for retaining the split ring 226 in the ring gear.

Protruding laterally from the split ring 226 opposite the split or slot therein is a stud 231. Pivotally mounted on the stud 231 is one end of a link 232. The other end of the link 232 extends into an outwardly pointing triangular recess 233 formed in the outer side of the first frame 202. In the recess 233 the link 232 is pivotally mounted on a headed pin 234 which extends through the holder 201 and is secured thereto by a cotter pin 235. In this arrangement rotation of the split ring 226 is limited during rotation of the ring gear 217 and the eccentricity of the opening 223 in the ring gear 217 causes the split ring 226 to oscillate.

Secured to the top of the stud 231 is one end of a cable 236. The other end of the cable 236 extends through another recess 237 formed in the holder and is secured to a terminal post 240 fixed in the holder and projecting laterally through the side plate 212 for having a line from a controlled power source connected thereto. By this arrangement current may be supplied at the will of the operator to the split ring 226. Secured to and lining the inner periphery of the split ring 226 in current conducting relationship is a split ring electrode 241 formed of a high resistance material such as tungsten or sintered thoria-tungsten.

When the tubing to be welded is clamped in welding position it engages or is just adjacent the innermost portion of the electrode 241 in the manner shown in Fig. 11. Then the ring gear 217 is driven in either direction approximately 200° and stopped. During the 200° of rotation of the ring gear the ring gear and the link 232 coact to position the point 242 or the point 243 on the electrode, depending upon the direction in which the ring gear is rotated, adjacent the periphery of the joint to be welded. Thereafter, the operator strikes an arc between the electrode 241 and the tubing and causes the ring gear to rotate approximately 400° in the direction opposite that in which it was initially rotated. During this 400° of rotation of the ring gear the inner surface of the electrode 241 is brought progressively close to the joint or, in other words, the electrode is rotated about the tubing. This results in the arc progressing or being rolled about the inner surface of the electrode and the joint whereby a circumferential weld having approximately 40° overlap is effected on the tubing.

It is to be understood that the second embodiment 200 may also be provided with means for directing an inert gas at the tubing during the welding operation. This means could be in the form of a horseshoe-shaped shield for being supplied with argon or helium and having side portions extending over the sides of the electrode 241 whereby the gas would be directed at the weldment. Also, if a form of the second embodiment were constructed for welding large tubing or pipes the split ring 26 could be formed to include a passage for having a coolant passed therethrough.

In Figs. 13–15 I have shown a third embodiment of my invention, generally designated 245, and including a holder or holder assembly 246. The holder 246 comprises first and second frames 247 and 248, respectively, formed of an insulative material, such as micarta, and suitably secured together by a plurality of screws 249. As in the first-described embodiment, the holder 246 is formed in two pieces in order to facilitate the provision of openings, bearing housings and the general assembly of the device but will be hereinafter treated as though it were one complete frame member to simplify description.

As seen in Figs. 13 and 14, the holder 246 is formed with an enlarged transverse circular opening 250. A slot 251 formed in the holder connects the opening 250 with the exterior of the holder and permits the holder to be passed over the sides of the ends of the tubes to be joined or butt welded. Formed centrally in the inner periphery of the circular opening 250 is an annular groove 252. Disposed in the annular groove 252 is the back or toothed rim 253 of an annular member or ring gear 254, formed of an electrically conductive material, such as steel or bronze. Formed on either side of the toothed rim 253 is a shoulder 255 which bears on the periphery of the circular opening 250 adjacent the annular groove formed therein.

Provided in the ring gear 254 and corresponding to the slot 251 in the holder is a split or slot 256. When the slot 256 in the ring gear and the slot 251 in the holder are in register or aligned, the ends of the tubing to be welded are permitted entrance into the ring gear. After the tube ends have been admitted into the ring gear, they are held concentric with respect thereto by clamping means (not shown) similar to that described above with respect to the first embodiment.

Provided for effecting the arc to weld and thereby join the tube ends is an electrode 257 which may be identical to that of the first embodiment. The electrode 257 is disposed stationarily and concentrically in a spout 258 from the end of which just the tip of the electrode protrudes. The spout 258 is satisfactorily secured radially to the inner periphery of the ring gear and is in communication with an arcuate gas passage 259 in the ring gear. In the arrangement described to this point, the ring gear 254 is adapted for being rotated and when causes the tip of the electrode 257 to circumscribe a circle approximating the circumference of a weld to be effected between the ends of the tubes to be joined. Additionally, the passage 259 is adapted for conducting an inert gas to the spout whereby it is directed toward the arc struck between the tip of the electrode and the tubes.

Provided for meshing with the toothed rim 253 of the ring gear 254 to rotate the ring gear for rolling the electrode about the tubing is a worm 260. The worm 260 is disposed in a housing 261 formed in the holder 246 and communicating with the circular opening 250. The worm 260 is fixed on a drive shaft 262 in a longitudinal passage 263 extending through the holder. On either side of the worm 260 the shaft 262 is suitably journaled in bearing blocks suitably secured in the holder. As in the first embodiment, the shaft 262 is formed in two lengths which are connected in a housing 264 in the holder by a flexible coupling 265. By the arrangement just described, the ring gear 254 is adapted for being driven or rotated thereby to roll the electrode 257 about the tubing to be joined.

Provided for controlling a motor (not shown) adapted for driving the shaft 262 and thereby controlling the rotation of the ring gear 254 is a micro-switch generally designated 266. The switch 266 is suitably electrically connected to a plug 266a adapted for having a control line to the motor connected thereto. The switch 266 includes a switch arm 267 carrying a roller 268 adapted for cooperating with a cam 269. The cam 269 is secured on a shaft 270 suitably journaled in the holder 246. Also secured on the shaft 270 and disposed in a housing 271 is a worm gear 272 adapted for meshing with a worm 273 secured on the shaft 262. This arrangement facilitates the alignment of the slots in the ring gear and holder for admission of the tubing to be welded into the ring gear and for removal of the tubing after welding. Additionally, it may be employed for controlling a flow of current to the electrode and inert gas to the spout.

In order to supply current to the electrode 257 and gas to the passage 259, I have provided a gas ring 274, formed of copper or any similarly electrically conductive material. By use of the gas ring 274, I accomplish not only the supply of current to the electrode and gas to the spout surrounding the electrode but I additionally cool the welding device. The gas ring 274 is horseshoe-like in construction and lies in a plane adjacent the ring gear 254 between the ring gear and an insulative sideplate 275, secured to the outer side of the frame 248. A similar insulative plate 276 is secured to the outer side of the opposite frame 247. The plates 275 and 276 cover substantially all of both ends of the circular opening 250 except for suitable openings which are aligned with each other and concentric with the ring gear 254. Additionally, the plates 275 and 276 include slots corresponding substantially to the slots in the ring gear and holder.

Extending radially outward from the center of the gas ring 274 is an arm 277 which is disposed in an elongated recess 278 formed in the outer side of the frame 248 and covered by the plate 275. The gas ring 274 is secured to the holder in the recess 278 by an element 279 which passes through the extremity of the arm 277 and is threaded into the holder. The element 279 carries a coil spring (not shown) which engages the arm 277 for urging the center of the gas ring inwardly into engagement with the side of the ring gear. Biasing the ends of the gas ring into engagement with the ring gear are leaf springs (not shown).

Formed in the inner side of the gas ring 274 is an arcuate gas passage 280. The passage 280 communicates with a pair of bores 281 formed diametrically opposite in the ring gear 254 for providing communication between the gas groove in the gas ring and the arcuate passage 259 in the ring gear. Biased for closing each of the bores 281 is a ball 282. This arrangement is such that in any rotative position of the ring gear at least one of the balls 282 will be unseated with respect to its corresponding bore 281 by engagement with the gas ring 274 for thereby providing communication between the gas groove 280 in the gas ring and the arcuate passage 259 in the ring gear.

Communicating with the gas groove 280 for supplying the inert gas thereto for delivery to the spout 258 through the passage 259 is a tube 283, extending through a suitable passage in the holder 246.

Suitably formed in the gas ring 274 is a coolant passage 284. The coolant passage 284 extends from one end of the arcuate gas ring to the opposite end and then returns to the one end. To the ends of the passage 284 are suitably connected a coolant supply tube 285 and a return tube 286. With this arrangement, a coolant, such as water, may be caused to flow through the passage 284 in the gas ring for absorbing heat resulting from the welding operation. Current from an exterior source is conducted to the gas ring 274 for conduction thereby to the ring gear for supplying the electrode 257 by a cable 287. The cable 287 extends through the coolant tube 285 and is suitably electrically connected to the gas ring. Graphite may be utilized on the engaging surfaces between the gas ring and the ring gear to minimize galling and to reduce resistance to the flow of current from the gas ring to the ring gear.

As seen in Fig. 13, the ring gear 254 carries a gate 288. The gate 288 is pivotally mounted at 289 and is operative in the same manner and for the same purpose described above with respect to the first embodiment of my invention, namely, to minimize gas leakage from the gas groove 280 during operation of the device and to open the slot 256 in the ring gear when it lies in register with the slot 251 in the holder.

The just-described third embodiment of my invention is particularly adaptable for use with a fixture clamping mechanism and for being operated automatically. That is, the device could be so mounted with respect to a fixture that the butts ends of tubing to be welded when clamped in the fixture would be satisfactorily positioned for welding. Then by throwing a starting switch (not shown), an operator could concurrently effect the striking of an arc between the electrode and the tubing, start a flow of inert gas to the spout and energize the motor (not shown) for driving the ring gear through the shaft for rolling the electrode about the tubing to join the butt ends thereof. Following completion of the weld and upon realignment of the slots in the ring gear and holder, the cam 269 could be effective for actuating the switch arm 267 for operating the micro-switch 266 to open the operating circuit, thereby concurrently to deenergize the motor (not shown) and discontinue the flow of current and gas to the gas ring. Additionally, operation of the micro-switch 266 could be effective for energizing means such as a magnetic brake for effecting substantially immediate stoppage of the motor thereby to insure satisfactory alignment of the slot in the ring gear with the slot in the holder to permit exit of the tubing joined and admission of other tube ends to be butt welded.

While I have shown and described specific embodiments of my invention, I do not desire my invention to be limited to the particular forms shown and described and I intend in the appended claims to cover all modifications within the spirit and scope of my invention.

What I claim as new and desire to secure by Letters Patent of the United States is:

1. In a device for butt welding tubing, a rotatable annular member, said annular member including a slot for admitting into the interior of said annular member tubing to be welded, means for holding said tubing concentric with said annular member, an electrode on the interior of said annular member, means for supplying current to said electrode for effecting an arc between said electrode and said tubing, means for rotating said annular member, and means whereby rotation of said annular member effectively rotates said electrode about said tubing thereby to effect a circumferential weld on said tubing.

2. In a device for butt welding tubing, a ring gear, said ring gear including a slot for admitting into the interior of said ring gear tubing to be welded, means for holding said tubing concentric with said ring gear, an electrode on the interior of said ring gear, means supplying current to said electrode for effecting an arc between said electrode and said tubing, a worm drive for rotating said ring gear, and means whereby rotation of said ring gear effectively rotates said electrode about said tubing thereby to effect a circumferential weld on said tubing.

3. In a device for butt welding tubing, an insulative holder including an opening and a slot connecting said opening with the exterior of said holder, a ring gear rotatably mounted in said opening of said holder, said ring gear including a slot corresponding to said slot in said holder, said slot in said holder and said slot in said ring gear being adapted when in register to admit into the interior of said ring gear tubing to be welded, means for holding said tubing concentric with said ring gear, an electrode on the interior of said ring gear, means supplying current to said electrode for effecting an arc between said electrode and said tubing, a worm drive housed in said holder for rotating said ring gear, and means whereby rotation of said ring gear effectively rotates said electrode about said tubing thereby to effect a circumferential weld on said tubing.

4. In a device for butt welding tubing, a rotatable annular member, said annular member including a slot for admitting into the interior of said annular member tubing to be welded, means for holding said tubing concentric with said annular member, an electrode carried on the interior of said annular member and projecting radially toward said tubing, means supplying current to said electrode for effecting an arc between said electrode and said tubing, and means for rotating said annular member whereby said electrode is rotated about said tubing to effect a circumferential weld on said tubing.

5. In a device for butt welding tubing, a ring gear, said ring gear including a slot for admitting into the interior of said ring gear tubing to be welded, means for holding said tubing concentric with said ring gear, an electrode carried on the interior of said ring gear and projecting radially toward said tubing, means supplying current to said electrode for effecting an arc between said electrode and said tubing, and a worm drive for rotating said ring gear whereby said electrode is rotated about said tubing to effect a circumferential weld on said tubing.

6. In a device for butt welding tubing, an insulative holder including an opening and a slot connecting said opening with the exterior of said holder, a ring gear rotatably mounted in said opening of said holder, said ring gear including a slot corresponding to the slot in said holder, said slot in said holder and said slot in said ring gear being adapted when in register to admit into the interior of said ring gear tubing to be welded, means for holding said tubing concentric with said ring gear, an electrode carried on the interior of said ring gear and projecting radially toward said tubing, means supplying current to said electrode for effecting an arc between said electrode and said tubing, and a worm drive housed in said holder for rotating said ring gear whereby said electrode is rotated about said tubing to effect a circumferential weld on said tubing.

7. In an inert arc welding device for butt welding tubing, a rotatable anular member, said annular member including a slot for admitting into the interior of said annular member tubing to be welded, means for holding said tubing concentric with said annular member, an electrode carried on the interior of said annular member and projecting radially toward said tubing, means supplying current to said electrode for effecting an arc between said electrode and said tubing, means for rotating said annular member whereby said electrode is rotated about said tubing to effect a circumferential weld on said tubing, a spout carried on the interior of said annular member for directing an inert gas at the weldment effected by said electrode, and means effectively supplying an inert gas to said spout during rotation of said annular member.

8. In an inert arc welding device for butt welding tubing, a ring gear, said ring gear including a slot for admitting into the interior of said ring gear tubing to be welded, means for holding said tubing concentric with said ring gear, an electrode carried on the interior of said ring gear and projecting radially toward said tubing, means supplying current to said electrode for effecting an arc between said electrode and said tubing, means for rotating said ring gear, a worm drive for rotating said ring gear whereby said electrode is rotated about said tubing to effect a circumferential weld on said tubing, a spout carried on the interior of said ring gear for directing an inert gas at the weldment effected by said electrode, and means for effectively supplying an inert gas to said spout during rotation of said ring gear.

9. In an inert arc welding device for butt welding tubing, an insulative holder including an opening and a slot connecting said opening with the exterior of said holder, a ring gear rotatably mounted in said opening of said holder, said ring gear including a slot corresponding to the slot in said holder, said slot in said holder and said slot in said ring gear being adapted when in register to admit into the interior of said ring gear tubing to be welded, means for holding said tubing concentric with said ring gear, an electrode carried on the interior of said ring gear and projecting radially toward said tubing, means supplying current to said electrode for effecting an arc between said electrode and said tubing, a worm drive housed in said holder for rotating said ring gear whereby said electrode is rotated about said tubing to effect a circumferential weld on said tubing, a spout carried on the interior of said annular member for directing an inert gas at the weldment effected by said electrode, and means for effectively supplying an inert gas to said spout during rotation of said annular member.

10. In an inert arc welding device for butt welding tubing, a rotatable electrically conductive annular member, said annular member including a slot for admitting into the interior of said annular member tubing to be welded, means for holding said tubing concentric with said annular member, a spout carried on the interior of said annular member and projecting radially toward said tubing, an electrode disposed in said spout, and extending therefrom toward said tubing, said electrode being electrically connected to said annular member, a stationary electrically conductive ring engaging one side of said annular member, said ring being split for permitting admittance of said tubing into said annular member, means supplying current to said ring for conduction through said annular member to said electrode for effecting an arc between said electrode and said tubing, means for rotating said annular member whereby said electrode is rotated about said tubing to effect a circumferential weld on said tubing, a pair of diametrically opposed bores formed transversely in said annular member, an arcuate groove formed in the inner side of said ring, means for supplying an inert gas to said arcuate groove, said arcuate groove communicating with at least one of said bores at any rotative position of said annular member, and means commonly connecting said bores with said spout whereby said inert gas is directed at the weldment effected by said electrode.

11. In an inert arc welding device for butt welding tubing, an electrically conductive ring gear, said ring gear including a slot for admitting into the interior of said ring gear tubing to be welded, means for holding said tubing concentric with said ring gear, a spout carried on the interior of said ring gear and projecting toward said tubing, an electrode disposed in said spout and extending therefrom toward said tubing, said electrode being electrically connected to said ring gear, a stationary electrically conductive ring engaging one side of said ring gear, said ring being split for permitting admittance of said tubing into said ring gear, means supplying current to said ring gear for conduction through said ring gear to said electrode for effecting an arc between said electrode and said tubing, a worm drive for rotating said ring gear whereby said electrode is rotated about said tubing to effect a circumferential weld on said tubing, a pair of diametrically opposed bores formed transversely in said ring gear, an arcuate groove formed in the inner side of said ring, means for supplying an inert gas to said arcuate groove, said arcuate groove communicating with at least one of said bores at any rotative position of said annular member of said ring gear, and means commonly connecting said bores with said spout whereby said inert gas is directed at the weldment effected by said electrode.

12. In an inert arc welding device for butt welding tubing, an insulative holder including an opening and a slot connecting said opening with the exterior of said holder, an electrically conductive ring gear rotatably mounted in said opening of said holder, said ring gear including a slot corresponding to the slot in said holder, said slot in said holder and said slot in said ring gear being adapted when in register to admit into the interior of said ring gear tubing to be welded, means for holding said tubing concentric with said ring gear, a spout carried on the interior of said ring gear and projecting radially toward said tubing, an electrode disposed in said spout and extending therefrom toward said tubing, said electrode being electrically connected to said ring gear, a stationary electrically conductive ring engaging one side of said ring gear, said ring being split for permitting admittance of said tubing into said ring gear, means whereby current is supplied to said ring for conduction through said ring gear to said electrode for effecting an arc between said electrode and said tubing, a worm drive housed in said holder for rotating said ring gear whereby said electrode is rotated about said tubing to effect a circumferential weld on said tubing, a pair of diametrically opposed bores formed transversely in said ring gear, an arcuate groove formed in the inner side of said ring, means for supplying an inert gas to said arcuate groove, said arcuate groove communicating with at least one of said bores at any rotative position of said ring gear, and means commonly connecting said bores with said spout whereby said inert gas is directed at the weldment effected by said electrode.

13. In an inert arc welding device for butt welding tubing, a rotatably electrically conductive annular member, said annular member including a slot for admitting into the interior of said annular member tubing to be welded, means for holding said tubing concentric with said annular member, a spout carried on the interior of said annular member and projecting radially toward said tubing, an electrode disposed in said spout and extending therefrom toward said tubing, said electrode being electrically connected to said annular member, a stationary electrically conductive ring engaging one side of said annular member, said ring being split for permitting admittance of said tubing into said annular member, means supplying current to said ring for conduction through said annular member to said electrode for effecting an arc between said electrode and said tubing, means for rotating said annular member whereby said electrode is rotated about said tubing to effect a circumferential weld on said tubing, a pair of diametrically opposed bores formed transversely in said annular member, an arcuate groove formed in the inner side of said ring, means for supplying an inert gas to said arcuate groove, said arcuate groove communicating with at least one of said bores at any rotative position of said annular member, and means commonly connecting said bores with said spout whereby said inert gas is directed at the weldment effected by said electrode, a member for closing said slot in said annular member, said member being biased for opening said slot, and cam operated means positioning said member for closing said slot during movement of said slot past said arcuate groove in said ring thereby to minimize gas leakage from said arcuate groove.

14. In an inert arc welding device for butt welding tubing, an electrically conductive ring gear, said ring gear including a slot for admitting into the interior of said ring gear tubing to be welded, means for holding said tubing concentric with said ring gear, a spout carried on the interior of said ring gear and projecting radially toward said tubing, an electrode disposed in said spout and extending therefrom towards said tubing, said electrode being electrically connected to said ring gear, a stationary electrically conductive ring engaging one side of said ring gear, said ring being split for permitting admittance of said tubing into said ring gear, means whereby current is supplied to said ring for conduction through said ring gear to said electrode for effecting an arc between said electrode and said tubing, a worm drive for rotating said ring gear whereby said electrode is rotated about said tubing to effect a circumferential weld on said tubing, a pair of diametrically opposed bores formed transversely in said ring gear, an arcuate groove formed in the inner side of said ring, means for supplying an inert gas to said arcuate groove, said arcuate groove communicating with at least one of said bores at any rotative position of said ring gear, means commonly connecting said bores with said spout whereby said inert gas is directed at the weldment effected by said electrode, a member for closing said slot in said ring gear, said member being biased for opening said slot, and cam operated means positioning said member for closing said slot during movement of said slot past said arcuate groove in said ring thereby to minimize gas leakage from said arcuate groove.

15. In an inert arc welding device for butt welding tubing, an insulative holder including an opening and a slot connecting said opening with the exterior of said holder, an electrically conductive ring gear rotatably mounted in said opening of said holder, said ring gear including a slot corresponding to the slot in said holder said slot in said holder and said slot in said ring gear being adapted when in register to admit into the interior of said ring gear tubing to be welded, means for holding said tubing concentric with said ring gear, a spout carried on the interior of said ring gear and projecting radially toward said tubing, an electrode disposed in said spout and extending therefrom toward said tubing, said electrode being electrically connected to said ring gear, a stationary electrically conductive ring engaging one side of said ring gear, said ring being split for permitting admittance of said tubing into said ring gear, means whereby current is supplied to said ring for conduction through said ring gear to said electrode for effecting an arc between said electrode and said tubing, a worm drive housed in said holder for rotating said ring gear whereby said electrode is rotated about said tubing to effect a circumferential weld on said tubing, a pair of diametrically opposed bores formed transversely in said ring gear, an arcuate groove formed in the inner side of said ring, means for supplying an inert gas to said arcuate groove, said arcuate groove communicating with at least one of said bores at any rotative position of said ring gear, means commonly connecting said bores with said spout whereby said inert gas is directed at the weldment effected by said electrode, a member for closing said slot in said ring gear, said member being biased for opening said slot, and cam operated means positioning said member for closing said slot during movement of said slot past said arcuate groove in said ring thereby to minimize gas leakage from said arcuate groove.

16. In an inert arc welding device for butt welding tubing, a rotatable electrically conductive annular member, said annular member including a slot for admitting into the interior of said annular member tubing to be welded, means for holding said tubing concentric with annular member, a spout carried on the interior of said annular member and projecting radially toward said tubing, an electrode disposed in said spout and extending therefrom toward said tubing, said electrode being electrically connected to said annular member, a stationary electrically conductive ring engaging one side of said annular member, said ring being split for permitting admittance of said tubing into said annular member, means whereby current is supplied to said ring for conduction through said annular member to said electrode for effecting an arc between said electrode and said tubing, means for rotating said annular member whereby said electrode is rotated about said tubing to effect a circumferential weld on said tubing, a pair of diametrically opposed bores formed transversely in said annular member, an arcuate groove formed in the inner side of said ring, means for supplying an inert gas to said arcuate groove, said arcuate groove communicating with at least one of said bores at any rotative position of said annular member, and means commonly connecting said bores with said spout whereby said inert gas is directed at the weldment effected by said electrode, a gate pivotally mounted on said annular member at said slot for closing said slot, said gate being biased for opening said slot, a stud projecting laterally from said gate, a face cam cooperating with said stud, said face cam positioning said gate for closing said slot during movement of said slot past said arcuate groove in said ring thereby to minimize gas leakage from said arcuate groove.

17. In an inert arc welding device for butt welding tubing, an electrically conductive ring gear, said ring gear including a slot for admitting into the interior of said ring gear tubing to be welded, means for holding said tubing concentric with said ring gear, a spout carried on the interior of said ring gear and projecting toward said tubing, an electrode disposed in said spout and extending therefrom toward said tubing, said electrode being electrically connected to said ring gear, a stationary electrically conductive ring engaging one side of said ring gear, said ring being split for permitting admittance of said tubing into said ring gear, means supplying current to said ring gear for conduction through said ring gear to said electrode for effecting an arc between said electrode and said tubing, a worm drive for rotating said ring gear whereby said electrode is rotated about said tubing to effect a circumferential weld on said tubing, a pair of diametrically opposed bores formed transversely in said ring gear, an arcuate groove formed in the inner side of said ring, means for supplying an inert gas to said arcuate groove, said arcuate groove communicating with at least one of said bores at any rotative position of said ring gear, and means commonly connecting said bores with said spout whereby said inert gas is directed at the weldment effected by said electrode, a gate pivotally mounted on said ring gear at said slot for closing said slot, said gate being biased for opening said slot, a stud projecting laterally from said gate, a face cam cooperating with said stud, said face cam positioning said gate for closing said slot during movement of said slot past said arcuate groove in said ring thereby to minimize gas leakage from said arcuate groove.

18. In an inert arc welding device for butt welding tubing, an insulative holder including an opening and a slot connecting said opening with the exterior of said holder, an electrically conductive ring gear rotatively mounted in said opening of said holder, said ring gear including a slot corresponding to the slot in said holder, said slot in said holder and said slot in said ring gear being adapted when in register to admit into the interior of said ring gear tubing to be welded, means for holding said tubing concentric with said ring gear, a spout carried on the interior of said ring gear and projecting radially toward said tubing, an electrode disposed in said spout and extending therefrom toward said tubing, said electrode being electrically connected to said ring gear, a stationary electrically conductive ring engaging one side of said ring gear, said ring being split for permitting admittance of said tubing into said ring gear, means supplying current to said ring for conduction through said ring gear to said electrode for effecting an arc between said electrode and said tubing, a worm drive housed in said holder for rotating said ring gear whereby said electrode is rotated about said tubing to effect a circumferential weld on said tubing, a pair of diametrically opposed bores formed transversely in said ring gear, an arcuate groove formed in the inner side of said ring, means for supplying an inert gas to said arcuate groove, said arcuate groove communicating with at least one of said bores at any rotative position of said ring gear, and means commonly connecting said bores with said spout whereby said inert gas is directed at the weldment effected by said electrode, a gate pivotally mounted on said ring gear at said slot for closing said slot, said gate being biased for opening said slot, a stud projecting laterally from said gate, a face cam cooperating with said stud, said face cam positioning said gate for closing said slot during movement of said slot past said arcuate groove in said ring thereby to minimize gas leakage from said arcuate groove.

19. In an inert arc welding device for butt welding tubing, an insulative holder including an opening and a slot connecting said opening with the exterior of said holder, an electrically conductive ring gear rotatably mounted in said opening in said holder, said ring gear including a slot corresponding to the slot in said holder, said slot in said holder and said slot in said ring gear being adapted when in register to admit into the interior of said ring gear tubing to be welded, means for holding said tubing concentric with said ring gear, a spout carried on the interior of said ring gear and projecting radially toward said tubing, an electrode disposed in said spout and extending therefrom toward said tubing, said electrode being electrically connected to said ring gear, a stationary electrically conductive gas ring disposed adjacent said ring gear, said gas ring being split for permitting admittance of said tubing into said ring gear, means biasing said gas ring into lateral engagement with said ring gear, means whereby current is supplied to said gas ring for conduction through said ring gear to said electrode for effecting an arc between said electrode and said tubing, a worm drive housed in said holder for rotating said ring gear whereby said electrode is rotated about said tubing to effect a circumferential weld on said tubing, a pair of diametrically opposed bores formed transversely in said ring gear, an arcuate groove formed in the inner side of said gas ring, means for supplying an inert gas to said arcuate groove, said arcuate groove communicating with at least one of said bores at any rotative position of said ring gear, a gate pivotally mounted on said ring gear at said slot for closing said slot, said gate being biased for opening said slot, a stud projecting laterally from said gate, a face cam cooperating with said stud, said face cam positioning said gate for closing said slot during movement of said slot past said arcuate groove in said ring thereby to minimize gas leakage from said arcuate groove.

20. In a device for butt welding tubing, a rotatable member, a ring rotatably mounted eccentrically in said rotatable member, an electrode lining the inner periphery of said ring, means for holding tubing to be welded in said ring concentric with said rotatable member and in close proximity to said electrode, means for conducting a current to said electrode whereby an arc is effected between said electrode and said tubing, means limiting the rotation of said ring, and means for rotating said rotatable member, rotation of said rotatable member and said means limiting the rotation of said ring coacting for rotating said electrode about said tubing whereby said arc progresses about said electrode and the circumference of said tubing to effect a circumferential weld on said tubing.

21. In a device for butt welding tubing, a rotatable annular member, said annular member including an eccentric opening and a slot connecting said eccentric opening with the exterior of said annular member, a ring rotatably mounted in said eccentric opening in said annular member, said ring including a slot corresponding to said slot in said annular opening, said slot in said annular member and said slot in said ring being adapted when in register to admit into the interior of said ring tubing to be welded, an electrode lining the inner periphery of said ring, means for holding said tubing in said ring concentric with said annular member and in close proximity to said electrode, means for conducting a current to said electrode whereby an arc is effected between said electrode and said tubing, a pivotal connection between said ring and a point beyond the outer periphery of said annular member for limiting rotation of said ring, and means for rotating said annular member, rotation of said annular member and said pivotal connection coacting for rotating said electrode about said tubing whereby said arc progresses about said electrode and the circumference of said tubing to effect a circumferential weld on said tubing.

22. In a device for butt welding tubing, a ring gear, said ring gear including an eccentric opening and a slot connecting said eccentric opening with the exterior of said ring gear, a ring rotatably mounted in said eccentric opening in said ring gear, said ring including a slot corresponding to said slot in said ring gear, said slot in said ring gear and said slot in said ring being adapted when in register to admit into the interior of said ring tubing to be welded, an electrode lining the inner periphery of said ring, means for holding said tubing in said ring concentric with said ring gear and in close proximity to said electrode, means for conducting a current to said electrode whereby an arc is effected between said electrode and said tubing, a link pivotally connecting said ring with a point beyond the outer periphery of said ring gear for limiting rotation of said ring, a worm drive for rotating said ring gear, rotation of said ring gear and said link coacting for rotating said electrode about said tubing whereby said arc progresses about said electrode and the circumference of said tubing to effect a circumferential weld on said tubing.

23. In a device for butt welding tubing, an insulative holder including an opening and a slot connecting said opening with the exterior of said holder, a ring gear rotatably mounted in said opening in said holder, said ring gear including an eccentric opening and a slot connecting said eccentric opening with the exterior of said ring gear and corresponding to said slot in said holder, a ring rotatably mounted in said eccentric opening in said ring gear, said ring including a slot corresponding to said slots in said ring gear and said holder, said slots in said holder, said ring gear and said ring being adapted when in register to admit into the interior of said ring tubing to be welded, an electrode lining the inner periphery of said ring, means for holding said tubing in said ring concentric with said ring gear and in close proximity to said electrode, means for conducting current to said electrode whereby an arc is effected between said electrode and said tubing, a link pivotally connecting said ring with said holder at a point beyond the outer periphery of said ring gear for limiting rotation of said ring, and a worm drive housed in said holder for rotating said ring gear, rotation of said ring gear and said link coacting for rotating said electrode about said tubing whereby said arc progresses about said electrode and the circumference of said tubing to effect a circumferential weld on said tubing.

24. In a device for butt welding tubing, an insulative holder including an opening and a slot connecting said opening with the exterior of said holder, a ring gear rotatably mounted in said opening in said holder, said ring gear including an eccentric opening and a slot connecting said eccentric opening with the exterior of said ring gear and corresponding to said slot in said holder, an electrically conductive ring rotatably mounted in said eccentric opening in said ring gear, said ring including a slot corresponding to said slot in said ring gear and said holder, said slots in said holder, said ring gear and said ring being adapted when in register to admit into the interior of said ring tubing to be welded, an electrode lining the inner periphery of said ring and secured to said ring in current conducting relationship, means for holding said tubing in said ring concetric with said ring gear and in close proximity to said electrode, a link pivotally connecting said ring at a point opposite said slot in said ring with said holder at a point beyond the periphery of said ring gear and opposite said slot in said holder, said link limiting the rotation of said ring, a worm drive housed in said holder for rotating said ring gear, said worm drive being operable in one direction whereby said eccentric opening in said ring gear and said link coact to bring one portion of said electrode adjacent one side of said slot in said ring in close proximity to said tubing, means for conducting current to said ring whereby said current is conducted to said electrode for effecting an arc between said one portion of said electrode and said tubing, said worm drive being operable in the opposite direction whereby said eccentric opening and said link coact for bringing said electrode into close proximity to said tubing progressively from said one portion to the portion adjacent the opposite side of said slot thereby to rotate said arc at least completely about said tubing for effecting a circumferential weld on said tubing.

25. In an inert arc welding device for butt welding tubing, a rotatable electrically conductive annular member, said annular member including a slot for admitting into the interior of said annular member tubing to be welded, an electrode carried on the interior of said annular member, a stationary electrically conductive ring engaging one side of said annular member, said ring being split for admittance of said tubing into said annular member, said ring being adapted for receiving current for conduction through said annular member to said electrode for effecting an arc between said electrode and said tubing, means for rotating said annular member whereby said electrode is rotated about said tubing to effect a circumferential weld on said tubing, and an arcuate passage formed in said ring, said arcuate passage being adapted for having a coolant flow therethrough.

26. In an inert arc welding device for butt welding tubing, a rotatable electrically conductive annular member, said annular member including a slot for admitting into the interior of said annular member tubing to be welded, an electrode carried on the interior of said annular member, said electrode being adapted to receive current for effecting an arc between said electrode and said tubing, means for rotating said annular member whereby said electrode is rotated about said tubing to effect a circumferential weld on said tubing, and means for controlling operation of said last-mentioned means in accordance with the rotative position of said annular member.

27. In an inert arc welding device for butt welding tubing, an insulative holder including an opening and a slot connecting said opening with the exterior of said holder, an electrically conductive ring gear rotatably mounted in said opening in said holder, said ring gear including a slot for admitting into the interior of said ring gear tubing to be welded, an electrode carried by and electrically connected to said ring gear, said ring gear being adapted for receiving current for conduction therethrough to said electrode for effecting an arc between said electrode and said tubing, a worm drive for rotating said ring gear whereby said electrode is rotated about said tubing to effect a circumferential weld on said tubing, another worm drive associated with said first worm drive, a cam operated by said second-mentioned worm drive, and a switch adapted for being operated by said cam, said switch controlling rotation of said ring gear, said cam opening said switch to stop rotation of said ring gear when said slot in said ring gear is aligned with said slot in said holder.

References Cited in the file of this patent

UNITED STATES PATENTS

| | | |
|---|---|---|
| 1,949,251 | Gilbert | Feb. 27, 1934 |
| 2,013,630 | Goldsborough | Sept. 3, 1935 |
| 2,350,716 | Bissont et al. | June 6, 1944 |